(12) United States Patent
Wang et al.

(10) Patent No.: US 10,279,749 B2
(45) Date of Patent: May 7, 2019

(54) ROOF RACK FOR A VEHICLE AND A VEHICLE HAVING THE SAME

(71) Applicant: Ford Global Technologies LLC, Dearborn, MI (US)

(72) Inventors: Joe Wang, Nanjing (CN); Helen Zou, Nanjing (CN); Peng Yu, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/866,288

(22) Filed: Jan. 9, 2018

(65) Prior Publication Data
US 2018/0201200 A1    Jul. 19, 2018

(30) Foreign Application Priority Data
Jan. 19, 2017  (CN) .......................... 2017 1 0038610

(51) Int. Cl.
*B60R 9/045*   (2006.01)
*B60R 9/058*   (2006.01)

(52) U.S. Cl.
CPC .............. *B60R 9/045* (2013.01); *B60R 9/058* (2013.01)

(58) Field of Classification Search
CPC ................................. B60R 9/045; B60R 9/058
See application file for complete search history.

(56) References Cited

U.S. PATENT DOCUMENTS

| 4,416,406 A | * | 11/1983 | Popeney | B60R 9/045 224/314 |
| 5,115,955 A | * | 5/1992 | Dallaire | B60R 9/12 224/315 |
| 5,340,007 A | * | 8/1994 | Jeuffray | B60R 9/045 224/315 |
| 5,377,890 A | * | 1/1995 | Brunner | B60R 9/045 224/309 |
| 5,395,024 A | | 3/1995 | Luchtenberg | |
| 5,511,709 A | * | 4/1996 | Fisch | B60R 9/045 224/316 |
| 6,286,739 B1 | * | 9/2001 | Stapleton | B60R 9/045 224/309 |
| 6,338,427 B1 | | 1/2002 | Aftanas et al. | |
| 6,811,066 B2 | * | 11/2004 | Aftanas | B60R 9/045 224/321 |
| 6,959,845 B2 | * | 11/2005 | Aftanas | B60R 9/045 224/321 |

(Continued)

FOREIGN PATENT DOCUMENTS

DE   10200753    7/2003
DE   10215971    11/2003
(Continued)

*Primary Examiner* — Justin M Larson
(74) *Attorney, Agent, or Firm* — Vichit Chea; Kolitch Romano, LLP

(57) ABSTRACT

A roof rack for a vehicle is provided. The roof rack includes at least one roof rail. The roof rail includes a main body having a first end and a second end opposite to the first end, a pivoting mechanism having a pivoting shaft at the first end and a locking mechanism disposed at the second end. The pivoting shaft is configured such that the main body is pivotable about an axis defined by the pivoting shaft, and the locking mechanism is configured to lock and release the second end of the main body.

20 Claims, 4 Drawing Sheets

(56) References Cited

U.S. PATENT DOCUMENTS

| | | | | |
|---|---|---|---|---|
| 7,066,364 B2* | 6/2006 | Kmita | ............... | B60R 9/045 224/321 |
| 7,090,103 B2* | 8/2006 | Aftanas | ............ | A61M 39/26 224/321 |
| 7,926,686 B2* | 4/2011 | Salvador | ............ | B60R 9/045 224/321 |
| 8,028,875 B2* | 10/2011 | Kmita | ............... | B60R 9/045 224/309 |
| 8,096,454 B2* | 1/2012 | Aftanas | ............... | B60R 9/045 224/321 |
| 8,251,267 B2* | 8/2012 | Aftanas | ............... | B60R 9/045 224/315 |
| 8,276,794 B2* | 10/2012 | Aftanas | ............... | B60R 9/045 224/315 |
| 8,308,035 B2* | 11/2012 | Polewarczyk | ......... | B60R 9/045 224/321 |
| 8,485,403 B2* | 7/2013 | Stahl | ................. | B60R 9/045 224/321 |
| 8,528,799 B2* | 9/2013 | Michie | ............... | B60R 9/048 224/321 |
| 8,640,934 B2* | 2/2014 | Jamieson | ............ | B60R 9/04 224/321 |
| 9,987,997 B2* | 6/2018 | Rarey | ............... | B60R 9/08 |
| 2018/0162287 A1* | 6/2018 | Ranka | ............... | B60R 9/052 |
| 2018/0201199 A1* | 7/2018 | Aftanas | ............... | B60R 9/045 |
| 2018/0201200 A1* | 7/2018 | Wang | ............... | B60R 9/045 |

FOREIGN PATENT DOCUMENTS

| | | |
|---|---|---|
| FR | 2865170 | 7/2005 |
| FR | 2920763 | 3/2009 |

\* cited by examiner

ROOF RACK FOR A VEHICLE AND A VEHICLE HAVING THE SAME

RELATED APPLICATION

This application claims the benefit of Chinese Patent Application No. CN 201710038610.4, filed Jan. 19, 2017, the entire contents thereof being incorporated herein by reference.

FIELD

The present disclosure relates to a roof rack of a vehicle, particularly, to a roof rack having a roof rail having one end rotatable out of a vehicle roof.

BACKGROUND

Some vehicles have a roof rack for carrying cargos such as luggage or a bicycle. A conventional roof rack includes two parallel longitudinal rails fixed on a roof panel of the vehicle. A cargo can be secured to the rails via a rope or other fixing tools. DE patent application No. DE10200753A1 discloses a roof rack, including two longitudinal rails and at least two lateral beams. Each lateral beam is received in a longitudinal recess in the corresponding longitudinal rails at a stowed position, and rotated out from the longitudinal rails at a deployed position such that the longitudinal rails and lateral beams form a supporting structure to hold a large cargo like a skateboard, a bicycle, or a luggage case. The inventors of the present disclosure have recognized that the roof rack can provide other functions in addition to carry a cargo.

SUMMARY

The present disclosure provides a roof rack for a vehicle to at least address some of the issues described above. The roof rack includes at least one roof rail with an end pivotable out of a roof panel of the vehicle for hanging articles. Further, the roof rack is easy to be assembled, low in manufacturing cost, and convenient for maintenance and replacement.

According to one aspect of the present disclosure, a roof rack for a vehicle is provided. The roof rack at least one roof rail. The roof rail includes a main body, a pivoting mechanism and a locking mechanism. The main body has a first end and a second end opposite to the first end. The pivoting mechanism includes a pivoting connected to the first end of the main body such that the main body is pivotable about an axis defined by the pivoting shaft. The locking mechanism is disposed at the second end of the main body and configured to lock and release the second end of the main body.

In some embodiments, the pivoting shaft has an upper end and a lower end opposite to the upper end, and the pivoting mechanism further includes a case to receive the lower end of the pivoting shaft and a bearing having an inner ring and an outer ring rotatory to each other. The outer ring is retained in the case, and the inner ring is fixed to the lower end of the pivoting shaft.

In some embodiments, the pivoting shaft includes a threaded part in the upper end, the main body includes an opening in the first end, and the threaded part of the pivoting shaft is connected with a nut via the opening in the first end of the main body to connect the pivoting mechanism and the main body.

In some embodiments, the first end of the main body includes a base and a cover disposed on the base, the base includes a honeycomb structure, the opening of the main body is formed in the base, and the base and the cover are connected via clips or interference fit.

In some embodiments, the pivoting mechanism further includes a retaining element disposed above the bearing and fitted on the case to limit the bearing from moving upwards or downwards.

In some embodiments, the case has an upper holding portion and a lower holding portion disposed below the upper holding portion and having a width less than that of the upper holding portion. The outer ring of the bearing is received in the lower holding portion, the retaining element includes a flange retained in the upper holding portion, one of the retaining element and the outer ring includes a plurality of protrusions, and another includes a plurality of recesses for receiving the protrusions.

In some embodiments, the pivoting shaft has a threaded hole in the lower end, the pivoting mechanism further includes a bolt and a flange having an opening, the flange is disposed below the bearing and has a diameter larger than an inner diameter of the inner ring, and bolt is engaged with the threaded hole of the pivoting shaft via the opening of the flange to connect the pivoting shaft and the inner ring of the bearing.

In some embodiments, the locking mechanism includes a latch catch and an operation button disposed on an outer surface of the second end of the main body, the latch catch is configured to engage with a latch bolt on a roof of the vehicle to lock the second end, and the operation button is configured to lock and release the latch catch.

In some embodiments, the roof rack further includes at least one stop disposed on the main body along a longitudinal direction, the stop includes a base and a head above the base, and the base is configured to be driven to move into or out of the main body by an actuation of the head.

In some embodiments, the main body includes an external sleeve and an internal sleeve slidably received in the external sleeve, and the internal sleeve is configured to move out of the external sleeve under a force to increase a length of the main body.

According to another aspect of the present disclosure, a vehicle is provided. The vehicle includes a roof panel and a roof rack including at least two parallel roof rails disposed on the roof panel. At least one of the roof rails includes a main body, a pivoting mechanism, and a locking mechanism. The main body is disposed above the roof panel and has a first end and a second end opposite to the first end. The pivoting mechanism has a pivoting shaft and is connected to the first end of the main body such that the main body is pivotable about an axis defined by the pivoting shaft. The locking mechanism is disposed at the second end of the main body and configured to fix the second end of the main body on the roof panel and release the second end from the roof panel.

In some embodiments, the pivoting mechanism further includes a case and a bearing, the pivoting shaft includes an upper end and a lower end opposite to the upper end and received in the case, the bearing has an inner ring and an outer ring rotatable each other, the outer ring is retained in the case, the inner ring is fixed to the lower end of the pivoting shaft, and the roof panel includes a housing to receive the case of the pivoting mechanism.

In some embodiments, the housing of the roof panel has a first opening at a bottom, and the case of the pivoting mechanism includes a bolt at a bottom, and the bolt is engaged with a nut via the first opening to fix the case to the roof panel.

In some embodiments, the housing of the roof has a second opening at the bottom, the case of the pivoting mechanism includes a protrusion at the bottom, and the protrusion is retained in the second opening to limit movement of the case.

In some embodiments, the upper end of the pivoting shaft extends beyond the housing of the roof panel and has a threaded portion, the main body has an opening at the first end, the threaded portion of the pivoting shaft is engaged with a nut via the opening of the first end to connect the pivoting mechanism with the main body.

In some embodiments, the vehicle further includes a sealing member for coving the recess in the roof panel, the sealing member is disposed below the first end of the main body, and the sealing member is formed with elastic materials.

In some embodiments, the locking mechanism includes an operation button disposed on an outer surface of the second end of the main body, a driving mechanism to be activated by the operation button, a latch catch connected with the driving mechanism; and a latch bolt disposed on the roof panel. The driving mechanism is configured to move the latch catch between a locked position and a released position in response to activation of the operation button. At the locked position, the latch catch is engaged with the latch bolt. At the released position, the latch catch is disengaged from the latch bolt.

In some embodiments, the vehicle further includes a rail stop configured to restrict movement of the roof rail at a predetermined position when the main body is pivoted to a position out of the roof panel.

According to another aspect of the present disclosure, a roof rail for a vehicle is provided. The roof rail includes an elongated rod having a first end and a second end opposite to the first end, a pivoting mechanism disposed at the first end of the elongated rod to connect the elongated rod with a roof of the vehicle, and a locking mechanism disposed at the second end of the elongated rod and configured to lock and release the second end. The elongated rod is capable of being rotated to a deployed position from a normal position when the second end of the elongated rod is released from the roof.

In some embodiments, the elongated rod is disposed parallel to a lengthwise direction of the vehicle at the normal position, and the pivoting mechanism includes a pivoting shaft connected with the first end of the elongated rod such that the elongated rod is pivotable about an axis of the pivoting shaft.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

The above advantages and other advantages, and features of the present description will be readily apparent from the following detailed description when taken alone or in connection with the accompanying drawings.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Embodiments of the present disclosure are described herein. It is to be understood, however, that the disclosed embodiments are merely examples and other alternative embodiments can take various forms. The figures are not necessarily to be drawn in scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
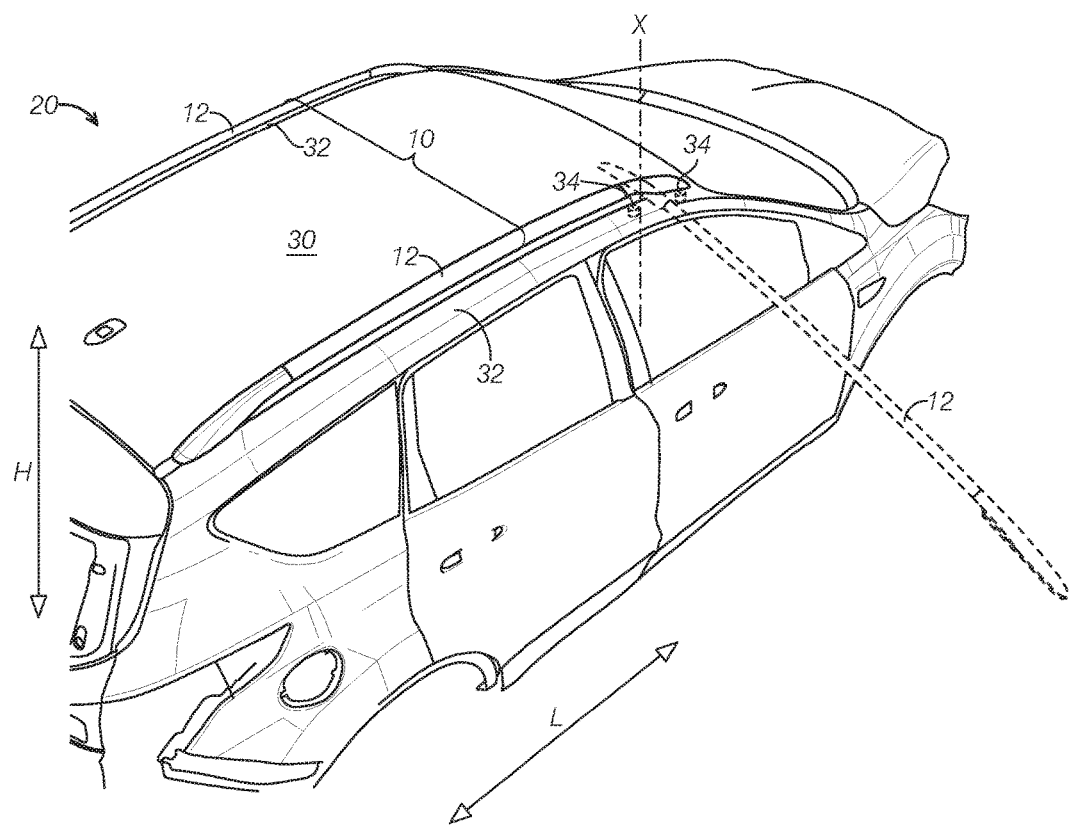
FIG. 1 is a perspective partial view of a vehicle including a roof rack according to one embodiment of the present disclosure, illustrating a roof rail of the roof rack at a normal position and at a deployed position.

FIG. 1 is a perspective partial view of a vehicle 20 including a roof rack 10 according to an embodiment of the present disclosure. The vehicle 20 includes a roof or roof panel 30 and the roof rack 10 disposed on the roof panel 30. The roof rack 10 may include a plurality of roof rails 12 (for example, at least two) disposed on the roof 30. The roof rails 12 are parallel and spaced away from each other, and disposed along a lengthwise direction L of the vehicle or the roof 30. The roof rails 12 may be disposed adjacent to two longitudinal edges 32 (i.e., the edge along direction L) of the roof 30 such that a large cargo loading space is defined between two roof rails 12. At least one of the roof rails 12 may pivot or rotate about an axis X parallel with a height direction H of the vehicle to move from a normal position (depicted in solid line in FIG. 1) to a deployed position (depicted in dashed line in FIG. 1).

It should be appreciated that the term "normal position" in the present disclosure refers to a position that the roof rail 12 is locked on the roof 30, i.e., the roof rail 12 is substantially parallel to the edge 32 of the roof 30 and the term "deployed position" refers to a position where the roof rail 12 has an angle with the edge 32 of the roof 30 and at least portion of the roof rail 12 extends outside the roof 30.

As shown in FIG. 1, the roof rail 12 at the right side of the roof 30 may pivot toward right to extend outside of the roof 30, and the roof rail 12 at the left side of the roof 30 may pivot toward left to extend outside of the roof 30. The roof rail 12 may be positioned along the lengthwise direction L at the normal position, and may form a cantilever at the deployed position. When a user of the vehicle drives the vehicle for outdoor activities such as camping, the user can rotate or pivot the roof rail 12 out of the roof 30 to hang clothing or lights.

Figure 2:
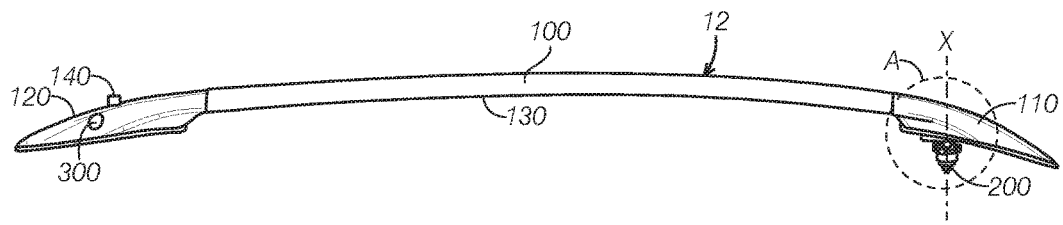
FIG. 2 is a perspective view of the roof rail in FIG. 1.

FIG. 2 is a perspective view of the roof rail 12 in FIG. 1. The roof rail 12 includes a main body 100, a pivoting mechanism 200 connected at a first end 110 of the body 100, and a locking mechanism 300 connected at a second end 120 of the body 100. The main body 100 may be an elongated rod or a beam. As shown in FIG. 2, the first end 110 is opposite to the second end 120, and the pivoting mechanism 200 is connected at a bottom of the first end 110. With reference to FIGS. 1 and 2, the first and second ends 110, 120 may be the front and rear end of the roof rail 10 in the direction L, respectively. As the locking mechanism 300 is released, the main body 100 or the second end 120 can be rotated about the first end 110, or about a longitudinal axis X of the pivoting mechanism 200.

It should be appreciated that, there are no limits for positions of the pivoting mechanism 200 and the locking mechanism 300 in the present disclosure. For example, the pivoting mechanism 200 may be disposed at the rear of the main body 100 and the locking mechanism 300 may be disposed at the front of the main body 100. The roof rail 12 may be pivoted about the rear of the main body 100 by pulling the second end 120 of the main body 100.

In some embodiments, a middle section 130 of the main body 100 between the first and second ends 110, 120 may include double sleeves slidable to each other (not shown). In such embodiments, the middle section 130 includes an outer sleeve and an inner sleeve received in the outer sleeve. At least a portion of the inner sleeve may slide out of the outer sleeve under an outside force, and the remaining portion of the inner sleeve is located in the outer sleeve. The portion of the inner sleeve out of the outer sleeve increases the length of the main body. That is, the double sleeves can provide the main body 100 with adjustable lengths. In this way, it is more convenient for users when the roof rail 12 is deployed for hanging clothing or lights.

In some embodiments, the middle section 130 may be formed from metal, such as aluminium. The first and second ends 110, 120 can be independently formed with resins, such as acrylonitrile butadiene styrene (ABS). The connection between the middle section 130 and the first end 110 or the second end 120 may be achieved via snap fit or fasteners such as clips, which are known to those with ordinary skills in the art and will not be described in detail.

The roof rail 12 may further includes at least one stop 140 disposed on the main body 100. In some embodiments, the stop 140 may be received in a recess formed in the main body 100 at a non-use state. When the main body 100 is rotated out of the roof 30 for hanging articles like clothing or lights, the stop 140 can prevent these objects from sliding off the roof rail 12 along the elongated main body 100. In some embodiments, a plurality of stops 140 may be disposed at the main body 100, and the main body 100 has a plurality of corresponding recesses to receive the stops 140 at the non-use position. In this way, a plurality of articles hanged on the roof rail 12 can be separately retained on the main body 100, and would not interfere each other. In some embodiments, the stop 140 includes a sleeve fitted around the main body 100 and a protrusion disposed on the sleeve and moveable in the sleeve. As the sleeve of the stop 140 can move along the main body 100 and be positioned at a desired location, a hanging point defined by the stop 140 can be adjusted. The stop 140 may be disposed at a distal end of the main body 100 far away from the pivoting axis X, such as at the middle section 130 or the second end 120 to prevent the hanged articles from contacting the vehicle 10.

Figure 6A:
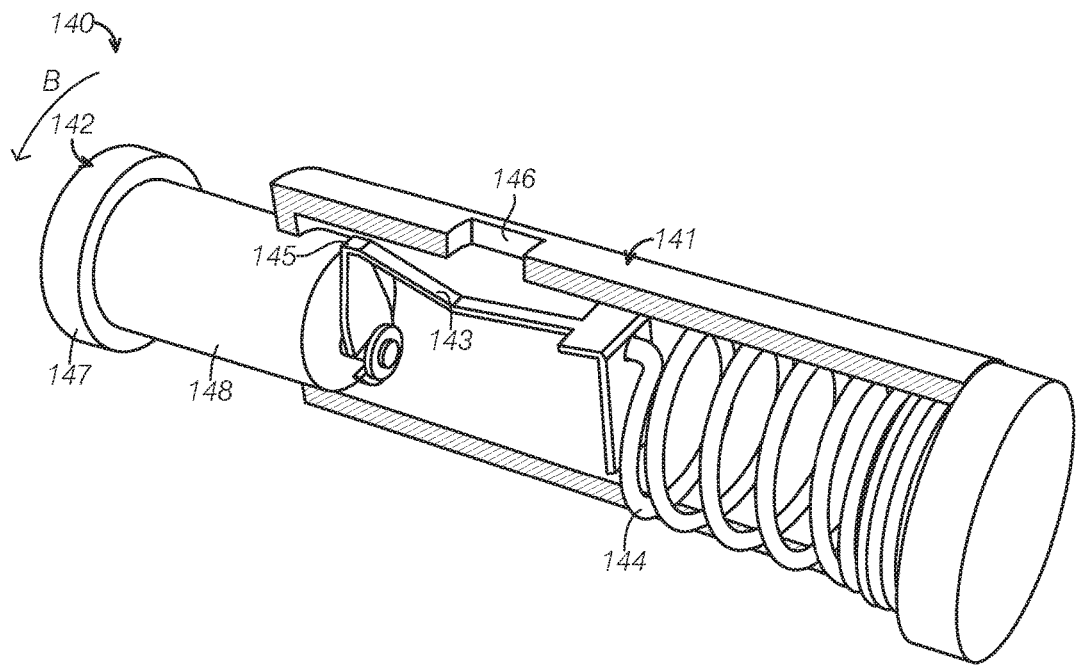
FIGS. 6A and 6B are perspective views of a stop of the roof rail in FIG. 2, illustrating a the stop at a working state and a stowed state, respectively.
Figure 6B:
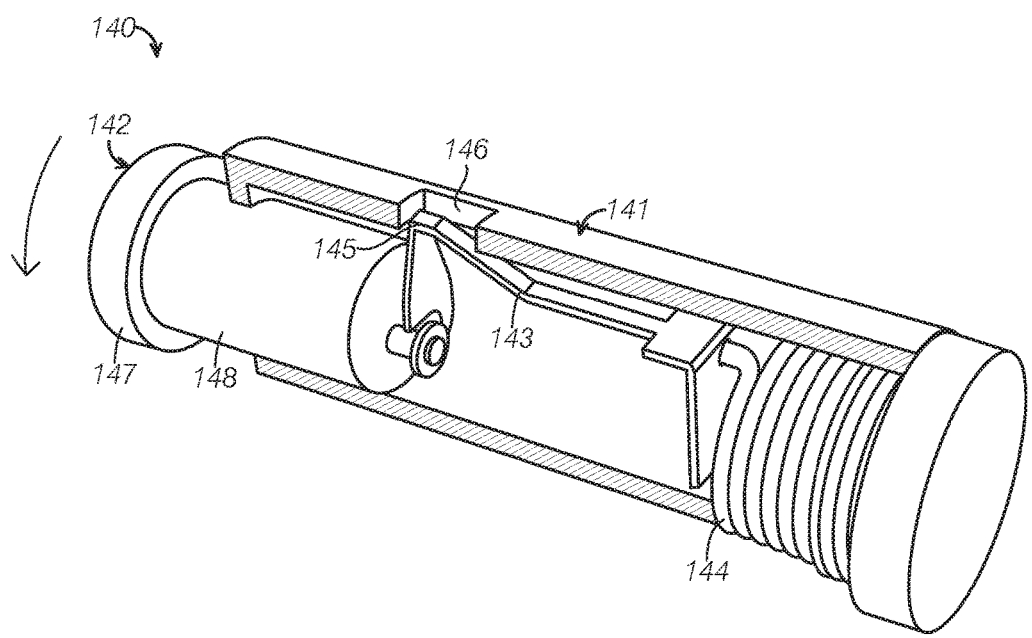

In some embodiments, the stop 140 may include an actuation structure. As shown in FIG. 6A, the stop 140 includes a sleeve 141 fitted in the main body 100 and a rotary button 142 disposed in the sleeve 141. The button 142 includes a head 147 extending out of the sleeve 141 and a base 148 coupled to a spring 144 fixed on the bottom of the sleeve 141 (e.g., an end of the sleeve 141 opposite to the button 142) via a linkage 143. The linkage 143 has a first end fixed at the base 148 of the button 142 and a second end connected to the spring 144. The first end of the linkage 142 has a protrusion 145, and the sleeve 141 has a recess 146 corresponding to the protrusion 145 in an inner wall. As the button 142 is pressed, the spring 144 is compressed, the protrusion 145 at the first end of the linkage 143 may move towards the recess 146 and finally retained in the recess 146, such that the base 148 of the button 142 is substantially received in the sleeve 141, as shown in FIG. 6B. In this way, the stop 140 is substantially received in the sleeve except for the head 147, and the effect on an appearance of the roof rail can be minimized. When the stop 140 is needed, the user can push and rotate the button 142 in a direction indicated by arrow B, the protrusion 145 may be moved out of the recess 146, the compressed spring 144 may return to the normal state and pushed the base 148 out of the sleeve 141. At this position, the base 148 is positioned out of the sleeve 141 and function as a stop to prevent the hanged articles from sliding further.

Figure 3:
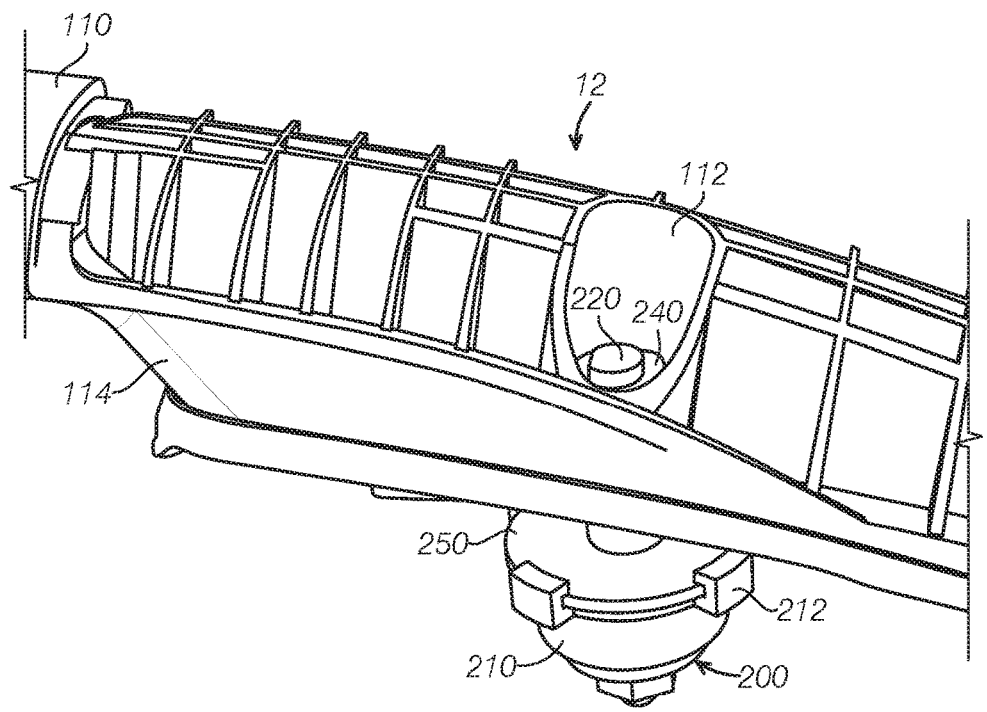
FIG. 3 is an enlarged perspective view of part A in FIG. 2, illustrating the roof rail with a cover being removed.
Figure 4:
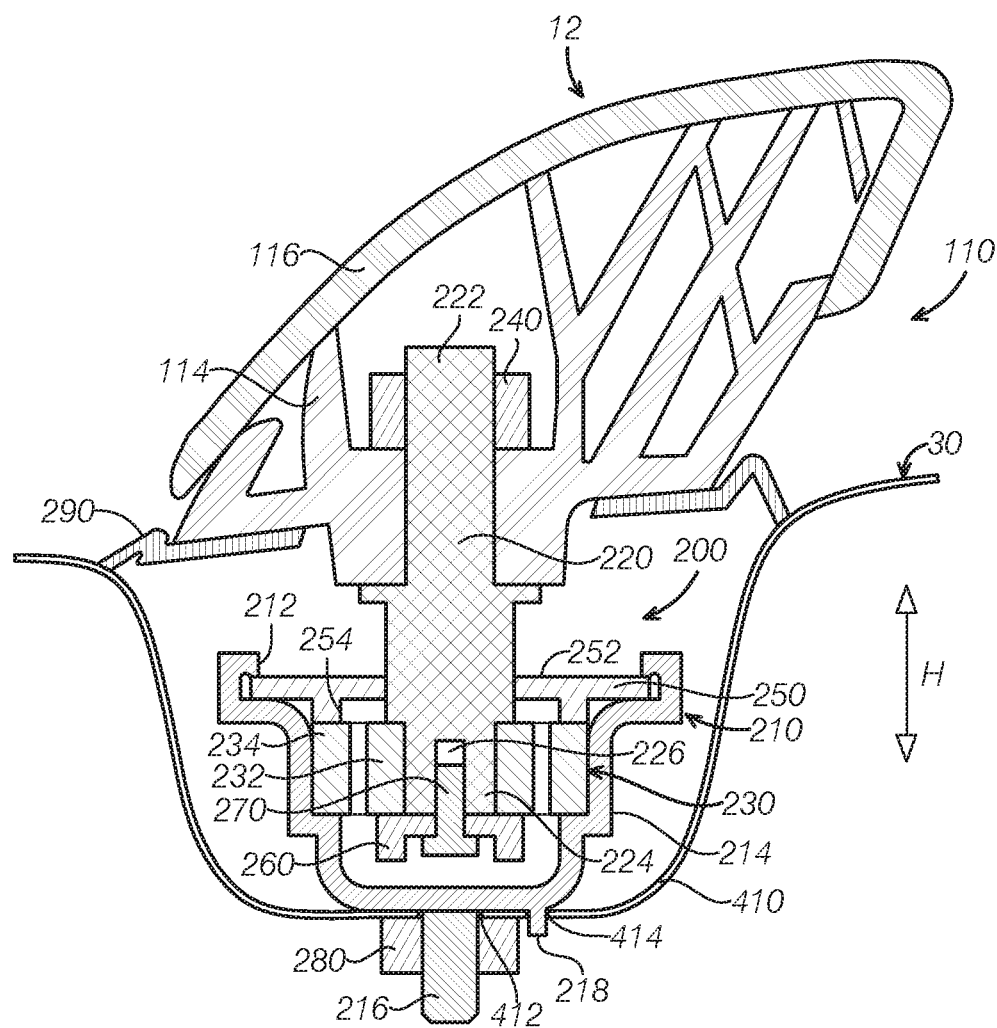
FIG. 4 is a cross-sectional partial view of the roof rail in FIG. 1, illustrating a pivoting mechanism of the roof rail, and a connection between the pivoting mechanism and a roof panel of the vehicle.

FIG. 3 is an enlarged view of part A in FIG. 2, illustrating the first end 110 of the main body 100 and the pivoting mechanism 200 with a cover of the roof rail 10 being removed. FIG. 4 is a cross sectional view of the part A in FIG. 3, illustrating a connection between the first end 110 and the roof 30. Referring to FIGS. 3 and 4, in some embodiments, the first end 110 of the main body 100 includes a lower part 114 and a cover 116 disposed on the lower part 114. The lower part 114 and the cover 116 may be connected via a conventional connection, such as fasteners or snap fit. As shown in FIG. 3, the lower part 114 of the first end 110 may have a honey comb structure, and may be made from an ABS part having ribs and hollow inner openings. In this way, the stiffness of the first end 110 can be maintained while the manufacturing cost can be reduced.

Referring to FIGS. 3 and 4, the pivoting mechanism 200 includes a casing 210, a bearing 230 disposed in the casing 210, and a pivoting shaft 220 connected with the bearing 230 and rotary in the casing 210. The pivoting shaft 220 has an upper portion 222 and an opposite lower portion 224. The upper portion 222 of the pivoting shaft 220 is connected to the first end 110 of the main body 100, and the lower portion 224 is disposed in the casing 210. As shown in FIG. 3, in some embodiments, the upper portion 222 of the pivoting shaft 220 may be formed with a threaded section, the first end 110 of the main body 100 has an opening 112 (e.g., in a lower portion 114 of the first end 110), and the threaded section of pivoting shaft 220 passes through the opening 112 to engage with a nut 240, such that the pivoting mechanism 200 is connected to the main body 100. It should be appreciated that, the connection between the pivoting shaft 220 and the main body 100 is not limited to the bolt-nut cooperation, those with ordinary skills in the art may use any appropriate connections according to practical assembling requirements.

As shown in FIG. 4, the bearing 230 has an inner ring 232 and an outer ring 234 rotatable to each other. The outer ring 234 is fixed in the casing 210, and the inner ring 232 is fixed with a lower portion 224 of the pivoting shaft 220. The casing may include a lower holding portion 214. The outer ring 234 of the bearing 230 has an outer diameter matched with an inner diameter of the lower holding portion 214, and is fixed in the lower holding portion 214. It should be appreciated that the term "fix" or "fixing" in the present disclosure may refer to a first element is received in a second element such that they may not be moveable relative to each other, e.g., the first element is retained in the second element via snap fit or fasteners such as bolt-nut.

The pivoting mechanism 200 may further include a retaining element 250 disposed on the bearing 230, and the casing 210 may include an upper holding portion 212 disposed above the lower holding portion 214 to hold the retaining element 250. The upper holding portion 212 is formed at an opening or the top of the casing 210 and communicated with the lower holding portion 214, and has a width or a diameter larger than that of the lower holding portion 214. The upper holding portion 212 has at least one recess. The retaining element 250 has a flange 252 matched with the recess, and the flange 252 is inserted into the recess, thus preventing the bearing 230 from moving upwards to the outside of the casing 210.

The retaining element 250 may further include a mechanism to connect with the outer ring of the bearing 230. In some embodiments, as shown in FIG. 4, the flange 252 includes at least one protrusion 254 at the lower surface (i.e., a surface of the flange facing the bearing 230), and the outer ring 234 of the bearing 230 includes at least one recess (not shown) at the upper surface (i.e., a surface of the outer ring 234 facing the flange 252). The protrusion 254 is retained in the recess to connect the retaining element 250 with the bearing such that a movement of the bearing in a direction H can be limited. In some embodiments, the positions of the protrusion and the recess may be exchanged. For example, the recess is formed in the lower surface of the flange, and the protrusion is formed at the upper surface of the outer ring 234.

The inner ring 232 of the bearing 230 is fixed with the lower portion 224. In some embodiments, as shown in FIG. 4, the pivoting shaft 220 has a threaded hole 226 in the lower portion 224. A flange 260 having an opening and a bolt 270 are disposed below the lower portion 224. The flange 260 has a diameter larger than an inner diameter of the inner ring 232, and the bolt 270 passes through the opening of the flange 260 to engage with the treaded hole 226 of the pivoting shaft 220 such that the pivoting shaft 220 may be fixed with the inner ring 232 of the bearing 230. In this way, rotation of the inner ring 232 in the outer ring 234 may cause the pivoting shaft 220 to rotate, and the main body 100 may rotate or pivot with the pivoting shaft 220 as the pivoting shaft 220 is fixed with the first end 110 of the main body 100.

Referring to FIG. 4, a housing 410 is formed in the roof 30, the casing 210 of the pivoting mechanism 200 is fixed in the housing 410, and the upper portion 222 of the pivoting shaft 220 extends beyond the housing 410 and is connected with the first end 110 of the main body 100. The housing 410 may be a chamber recessed from an upper surface of the roof 30 and have an opening at the top. The housing 410 includes a first opening 412 in the bottom, and a bolt 216 disposed at the bottom of the casing 210 of the pivoting mechanism 200. The bolt 216 passes through the first opening 412 of the housing 410 to engage with a nut 280 such that the pivoting mechanism 200 can be fixed in the housing 410 of the roof panel 30. In should be appreciate that, the connection between the casing 210 and the housing 410 is not limited to the bolt-nut connection as described, those with ordinary skills in the art can use any appropriate connections according to practical assembling requirements, such as welding.

In some embodiments, a restricting protrusion 28 is disposed at the bottom of the casing 210 of the pivoting mechanism 200. As shown in FIG. 4, the restricting protrusion 218 spaced from the bolt 216 is disposed at the bottom of the casing 210. The housing 410 has a second opening 414 at the bottom. The restricting protrusion 218 is inserted into the second opening 414 such that rotation of the casing 210 caused by rotation of the pivoting shaft 220 can be prevented.

In some embodiments, a sealing member 290 is disposed at the top of the housing 410 of the roof 30. The sealing member 290 may be a cover formed by elastic materials, such as rubber. The sealing member is disposed below the first end 110 of the main body 100 to cover the upper opening of the housing 410. In this way, pollutions or damages to the pivoting mechanism 200 in the housing 410 caused by rain, snow, or dust can be avoided.

It should be appreciated that, the main body 100 may be pivotably connected with the roof 30 with any suitable means such that the main body 100 can move from the normal position to the deployed position.

Referring to FIGS. 1 and 2, a locking mechanism 300 is disposed at the second end 120 of the main body 100 to retain or release the second end 120. In the normal position, the second end 120 of the main body 100 is retained at the roof by the locking mechanism. When the second end 120 is unlocked, the second end 120 can be pivoted out of the roof 30 to the deployed position, as shown by dashed lines in FIG. 1.

Figure 5:
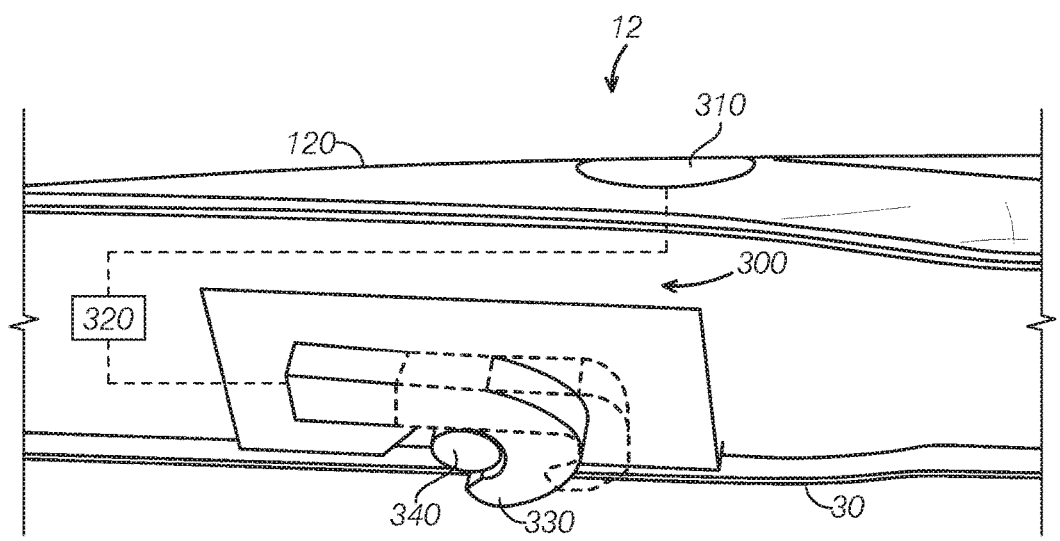
FIG. 5 is a perspective view of a part of the roof rail in FIG. 2, illustrating a locking mechanism of the roof rail.

Referring to FIG. 5, in some embodiments, the locking mechanism 300 includes an operation button 310 disposed at the outer surface of the second end 120 of the main body 100. It should be appreciated that the operation button 310 may be disposed at any suitable position convenient for a user, such as on the roof 30. The operation button 310 is communicated with a driving mechanism 320 and controls the driving mechanism 320. In some embodiments, the driving mechanism 320 is connected with a latch catch 330, and a latch bolt 340 corresponding to the latch catch 330 is disposed in the roof 30. At the normal position or a locked position the latch catch 330 is engaged with the latch bolt 340 to retain the second end 120 of the main body 100 on the roof 30. When the operation button 310 is activated by a user, the driving mechanism 320 drives the latch catch 330 to a released position (e.g., the position shown in dashed lines in FIG. 5) such that the latch catch 330 is disengaged with the latch bolt 340. At the released position, the user can push the second end 120 or the main body 100 to pivot the second end 120 about the first end 110 to the deployed position.

In some embodiments, the driving mechanism 320 may be linkages, a combination of gear and motor, or an electrical driving system. The latch catch 330 may be configured as an engagement hook and the latch bolt 340 may be configured as a striker. The driving mechanisms and the locking mechanisms are known to those with ordinary skills in the art and will not be described in detail.

Referring back to FIG. 1, in some embodiments, a rail stop 34 may be disposed at the roof 30 to prevent the main body 100 from pivoting or swaying at the deployed position. The rail stop 34 may include two protrusions. The two protrusions may be retracted into the roof 30 when the main body 100 is at the normal position, and protruded out of the roof 30 to restrict the rail 12 between the two protrusions at the deployed position to prevent the rail 12 from swaying. In one example, each of the protrusions may be constructed as a push push button which can be received in a recess upon one press, and pop out of the recess upon a second press. In some embodiments, the rail stop 34 may have a structure similar to that of the stop 140 as shown in FIGS. 6A and 6B, thus will not be described in detail.

According to the embodiments of the present disclosure, the roof rack can be pivoted out of the roof to form a cantilever for hanging the articles. Thus, the roof rack has additional function beside carrying cargos.

It should be appreciated that the embodiments described above are specific examples that do not encompass all possible forms of the disclosure. The features of the illustrated embodiments may be combined to form additional or alternative embodiments of the disclosed concepts. The words used in the specification are words of description rather than limitation, and it is understood that changes can be made without departing from the spirit and scope of the disclosure. The scope of the following claims is broader than the specifically disclosed embodiments and includes modifications of the illustrated embodiments.

The invention claimed is:

1. A roof rack for a vehicle, comprising:
   at least one roof rail including:
   a main body having a first end and a second end opposite to the first end;
   a pivoting mechanism having a pivoting shaft, wherein the pivoting shaft is connected to the first end of the main body such that the main body is pivotable about an axis defined by the pivoting shaft; and
   a locking mechanism disposed at the second end of the main body and configured to lock and release the second end of the main body,
   wherein the locking mechanism comprises a latch catch and an operation button, and wherein the latch catch is configured to engage with a latch bolt on a roof of the vehicle to lock the second end, and the operation button is configured to release the latch catch.

2. The roof rack of claim 1, wherein the pivoting shaft comprises an upper end and a lower end opposite to the upper end, and the pivoting mechanism further comprises:
   a case to receive the lower end of the pivoting shaft; and
   a bearing having an inner ring and an outer ring rotatory to each other, wherein the outer ring is retained in the case, and the inner ring is fixed to the lower end of the pivoting shaft.

3. The roof rack of claim 2, wherein the pivoting shaft includes a threaded part in the upper end, wherein the main body includes an opening in the first end, and wherein the threaded part of the pivoting shaft is connected with a nut via the opening in the first end of the main body to connect the pivoting mechanism and the main body.

4. The roof rack of claim 3, wherein the first end of the main body comprises a base and a cover disposed on the base, the base includes a honeycomb structure, and the opening of the main body is formed in the base, and wherein the base and the cover are connected via clips or interference fit.

5. The roof rail of claim 2, wherein the pivoting mechanism further comprises a retaining element disposed above the bearing and fitted on the case to limit the bearing from moving upwards or downwards.

6. The roof rack of claim 5, wherein the case comprises an upper holding portion and a lower holding portion disposed below the upper holding portion and having a width less than that of the upper holding portion, wherein the outer ring of the bearing is received in the lower holding portion, and wherein the retaining element comprises a flange retained in the upper holding portion, one of the retaining element and the outer ring includes a plurality of protrusions, and another includes a plurality of recesses for receiving the protrusions.

7. The roof rack of claim 2, wherein the pivoting shaft comprises a threaded hole in the lower end, wherein the pivoting mechanism further includes a bolt and a flange having an opening, the flange is disposed below the bearing and has a diameter larger than an inner diameter of the inner ring, and bolt is engaged with the threaded hole of the pivoting shaft via the opening of the flange to connect the pivoting shaft and the inner ring of the bearing.

8. The roof rack of claim 1, wherein the operation button is disposed on an outer surface of the second end of the main body.

9. The roof rack of claim 1, further comprising at least one stop disposed on the main body along a longitudinal direction, wherein the stop includes a base and a head above the base, and the base is configured to be driven to move into or out of the main body by an actuation of the head.

10. The roof rack of claim 9, wherein the main body comprises an external sleeve and an internal sleeve slidably received in the external sleeve, and the internal sleeve is configured to move out of the external sleeve under a force to increase a length of the main body.

11. A vehicle comprising:
    a roof panel; and
    a roof rack including at least two parallel roof rails disposed on the roof panel, wherein at least one of the roof rails includes a main body, a pivoting mechanism, and a locking mechanism, wherein the main body is disposed above the roof panel and has a first end and a second end opposite to the first end, wherein the pivoting mechanism has a pivoting shaft and is connected to the first end of the main body such that the main body is pivotable about an axis defined by the pivoting shaft, and wherein the locking mechanism is disposed at the second end of the main body and configured to fix the second end of the main body on the roof panel and release the second end from the roof panel,
    wherein the pivoting mechanism further includes a case and a bearing, wherein the pivoting shaft includes an upper end and a lower end opposite to the upper end and received in the case, wherein the bearing has an inner ring and an outer ring rotatable each other, the outer ring is retained in the case, and the inner ring is fixed to the lower end of the pivoting shaft.

12. The vehicle of claim 11, wherein the roof panel includes a housing to receive the case of the pivoting mechanism.

13. The vehicle of claim 12, wherein the housing of the roof panel has a first opening at a bottom, and the case of the pivoting mechanism includes a bolt at a bottom, and wherein the bolt is engaged with a nut via the first opening to fix the case to the roof panel.

14. The vehicle of claim 12, wherein the housing of the roof has a second opening at the bottom, the case of the pivoting mechanism includes a protrusion at the bottom, and the protrusion is retained in the second opening to limit movement of the case.

15. The vehicle of claim 12, wherein the upper end of the pivoting shaft extends beyond the housing of the roof panel and has a threaded portion, the main body has an opening at the first end, the threaded portion of the pivoting shaft is engaged with a nut via the opening of the first end to connect the pivoting mechanism with the main body.

16. The vehicle of claim 12, further comprising a sealing member for coving the recess in the roof panel and wherein the sealing member is disposed below the first end of the main body, and the sealing member is formed with elastic materials.

17. The vehicle of claim 11, wherein the locking mechanism comprises:
   an operation button disposed on an outer surface of the second end of the main body;
   a driving mechanism to be activated by the operation button;
   a latch catch connected with the driving mechanism; and
   a latch bolt disposed on the roof panel, wherein driving mechanism is configured to move the latch catch between a locked position and a released position in response to activation of the operation button, wherein, at the locked position, the latch catch is engaged with the latch bolt, and wherein, at the released position, the latch catch is disengaged from the latch bolt.

18. The vehicle of claim 11, further comprising a rail stop configured to restrict movement of the roof rail at a predetermined position when the main body is pivoted to a deployed position.

19. A roof rail for a vehicle, comprising:
   an elongated rod having a first end and a second end opposite to the first end;
   a pivoting mechanism disposed at the first end of the elongated rod to connect the elongated rod with a roof of the vehicle, wherein the pivoting mechanism includes a pivot shaft having an upper end and a lower end opposite to the upper end, a case to receive the lower end of the pivoting shaft; and a bearing having an inner ring and an outer ring rotatory to each other, and wherein the outer ring is retained in the case, and the inner ring is fixed to the lower end of the pivoting shaft; and
   a locking mechanism disposed at the second end of the elongated rod and configured to lock and release the second end,
   wherein the elongated rod is capable of being rotated to a deployed position from a normal position when the second end of the elongated rod is released from the roof.

20. The roof rail of claim 19, wherein the elongated rod is disposed parallel to a lengthwise direction of the vehicle at the normal position, and the pivoting shaft is connected with the first end of the elongated rod such that the elongated rod is pivotable about an axis of the pivoting shaft.

* * * * *